July 19, 1960 L. F. GARFIELD ET AL 2,945,476
ACTUATOR
Filed June 10, 1957 4 Sheets-Sheet 1

INVENTORS,
LAVERN F. GARFIELD,
WILLIAM W. WILLIAMS.
BY
ATTORNEY-

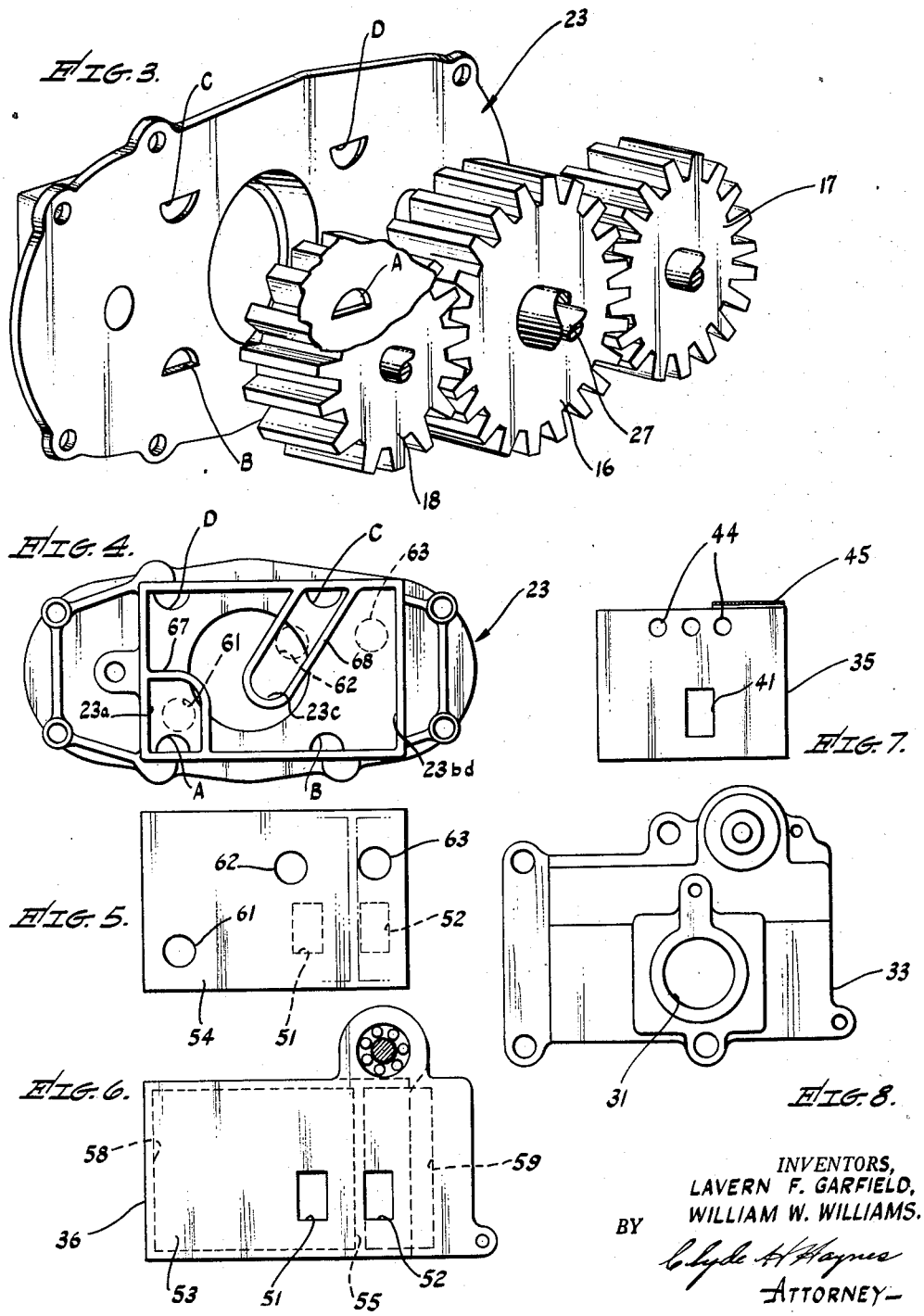

July 19, 1960
L. F. GARFIELD ET AL
2,945,476
ACTUATOR
Filed June 10, 1957
4 Sheets-Sheet 3
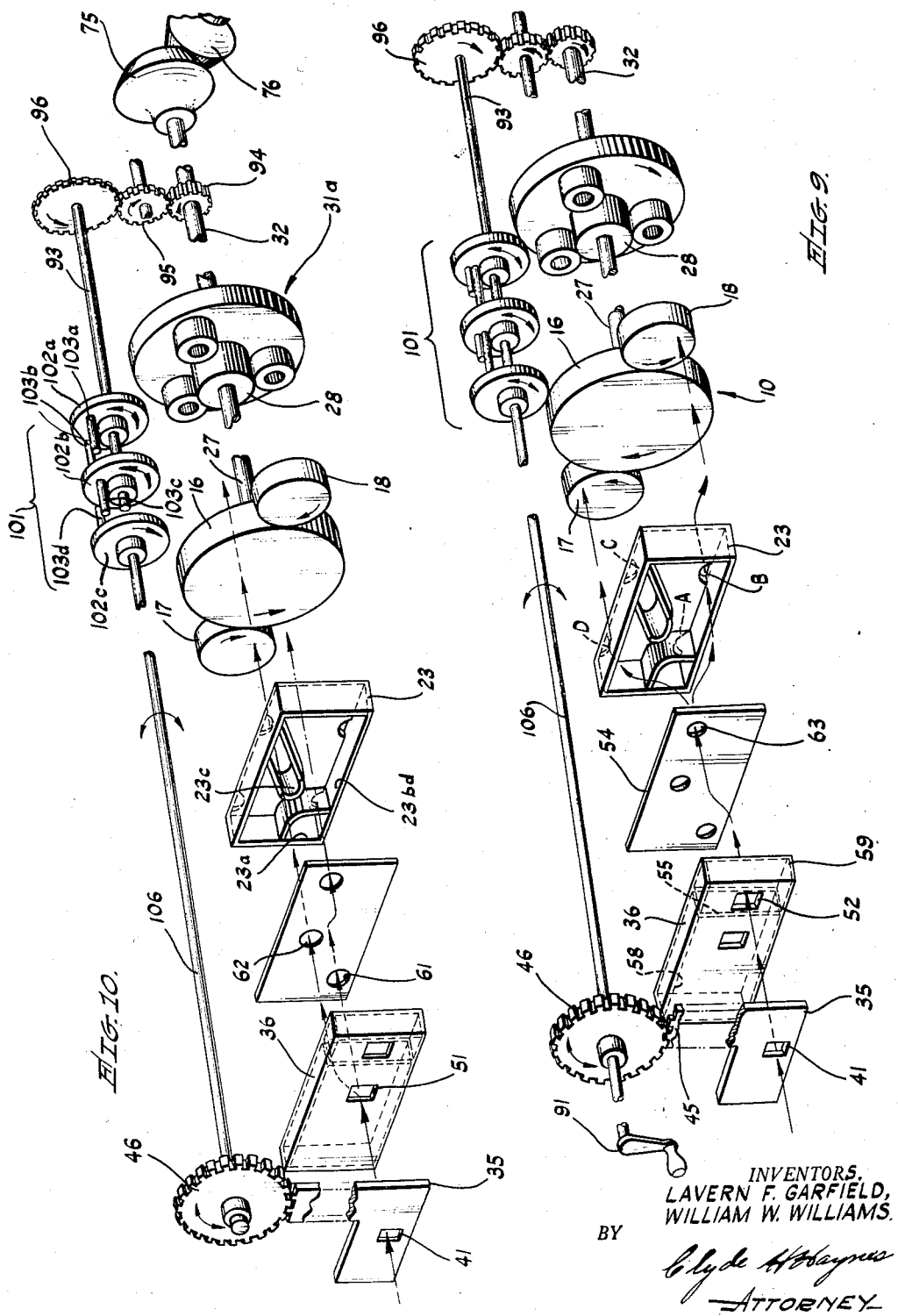
INVENTORS.
LAVERN F. GARFIELD,
WILLIAM W. WILLIAMS.
BY
Clyde H. Haynes
ATTORNEY July 19, 1960   L. F. GARFIELD ET AL   2,945,476
ACTUATOR
Filed June 10, 1957   4 Sheets-Sheet 4
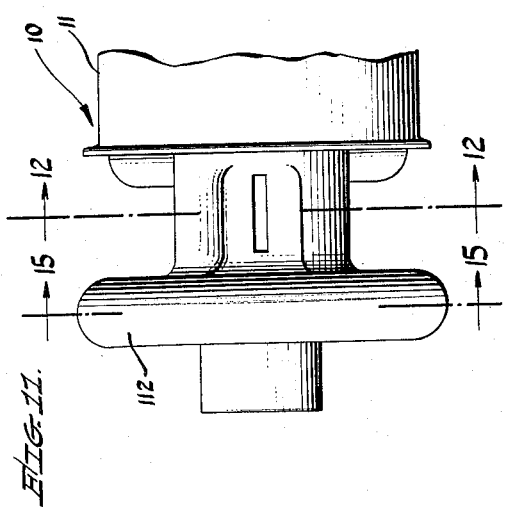
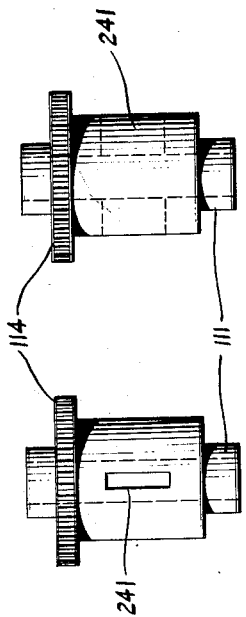
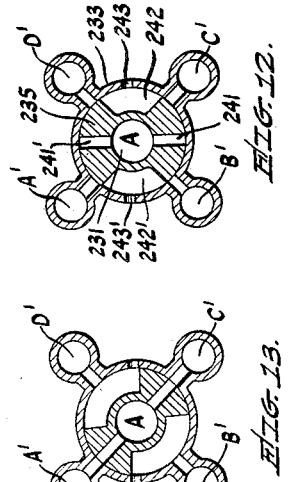
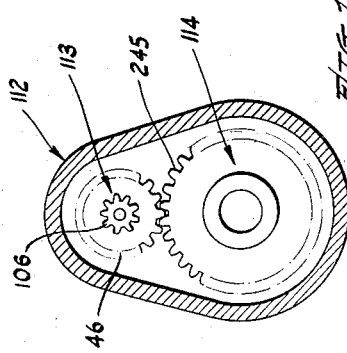
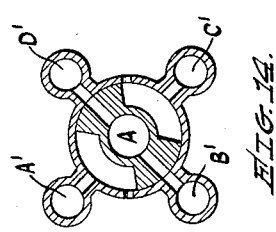
INVENTORS,
LAVERN F. GARFIELD,
WILLIAM W. WILLIAMS.
BY Clyde H. Haynes
ATTORNEY—

United States Patent Office 2,945,476
Patented July 19, 1960

2,945,476
ACTUATOR
Lavern F. Garfield and William W. Williams, Grand Rapids, Mich., assignors to Lear, Incorporated
Filed June 10, 1957, Ser. No. 664,705
1 Claim. (Cl. 121—39)

This invention relates to a mechanical stroking control for a power driven actuator to require driving of the actuator or prime mover in an opposite direction after it has been driven in a desired direction and before it can again be driven in the desired direction. The invention is particularly adaptable to a thrust reverser in which a bi-directional prime mover, such for example as a fluid motor, responds to a manually operable valve, the operation of which is controlled through a lost motion mechanism connected between the valve and the motor.

In the past bi-directional prime movers have been driven in a desired direction by pumping air or fluid through a suitable valve from a suitable pump to the prime mover or motor. Devices have also been connected between the valve and the output side of the motor which prevent the motor from being driven beyond established limits in either direction. Some of these devices included cumbersome and costly lost-motion drive which, when the motor was driven in one of its directions to its limit, positioned the valve in a neutral position and prevented the valve being actuated to again drive the motor in that direction until it had been driven in an opposite direction.

These prior devices were more complicated than necessary and took more weight and space than necessary when they were used in aircraft and subjected to the varying conditions and temperatures at which they were to operate properly.

The present invention thus has for one of its objects the provision of a simple, economically constructed, and dependable control interassociated with a bi-directional air motor and its control valve in such manner that the motor is prevented from driving again or beyond an established limit in one direction until after it has driven in the opposite direction.

Another object of the present invention is the provision of a compact foolproof unit having a bi-directional motor, a valve directing the direction of driving of the motor and including a neutral position at which the motor is not driving in either direction, and a lost motion device responsive to the motor to control the operation of the valve.

Another object of the invention resides in providing an actuator which is adapted for regular operation at an ambient temperature as high as 1000° F.

Another object is to provide with an actuator utilizing a fluid motor a self-cleaning valve for controlling the direction of rotation.

A further object is to provide an actuator as aforesaid including mechanism which will automatically stop the motor following a predetermined valve opening function and prepare the mechanism for a reverse stroke.

Other objects will become apparent from the ensuing description which, taken with the accompanying drawings, discloses a preferred embodiment of the invention.

In these drawings:

Fig. 3 is an exploded, perspective view to show details of the rotors of the motor and certain porting;

Fig. 4 is a detail of the motor manifold;

Fig. 5 is a detail of the manifold cover;

Fig. 6 is a detail of the valve body;

Fig. 7 is a detail of the movable valve plate;

Fig. 8 is a detail of the valve plate housing;

Fig. 9 is an exploded, perspective, schematic view of the entire actuator for one condition of operation;

Fig. 10 is a view similar to Fig. 9 showing another condition of operation.

Fig. 11 is a plan view of a modification of the invention wherein a rotary type valve is used;

Fig. 12 is a cross sectional view taken along line 12—12 of Fig. 11 and showing the valve in neutral or off position;

Fig. 13 is a cross sectional view similar to Fig. 12 but showing the valve in position to drive the motor in one direction;

Fig. 14 is a cross sectional view similar to Fig. 12 but showing the valve in position to drive the motor in a direction opposite that of Fig. 13;

Fig. 15 is a cross sectional view taken along the line 15—15 of Fig. 11; and

Figs. 16 and 17 are plan views of the rotor part of the valve to further show its construction.

In its broad aspects the invention comprehends the provision of a fluid rotary motor, e.g. operated by compressed air, arranged for reversible rotation and connected by a suitable geared transmission to an object to be actuated. A valve is adapted to initiate flow of air to the motor in response to a manual input force but to terminate flow automatically after some predetermined time interval. Such interval is preferably obtained by arranging that the output of the motor drive the valve plate to "off" position through a delay mechanism, preferably a lost motion mechanical connection. Thus, following actuation in one direction, the parts are in readiness for the reverse stroke.

Figure 1:
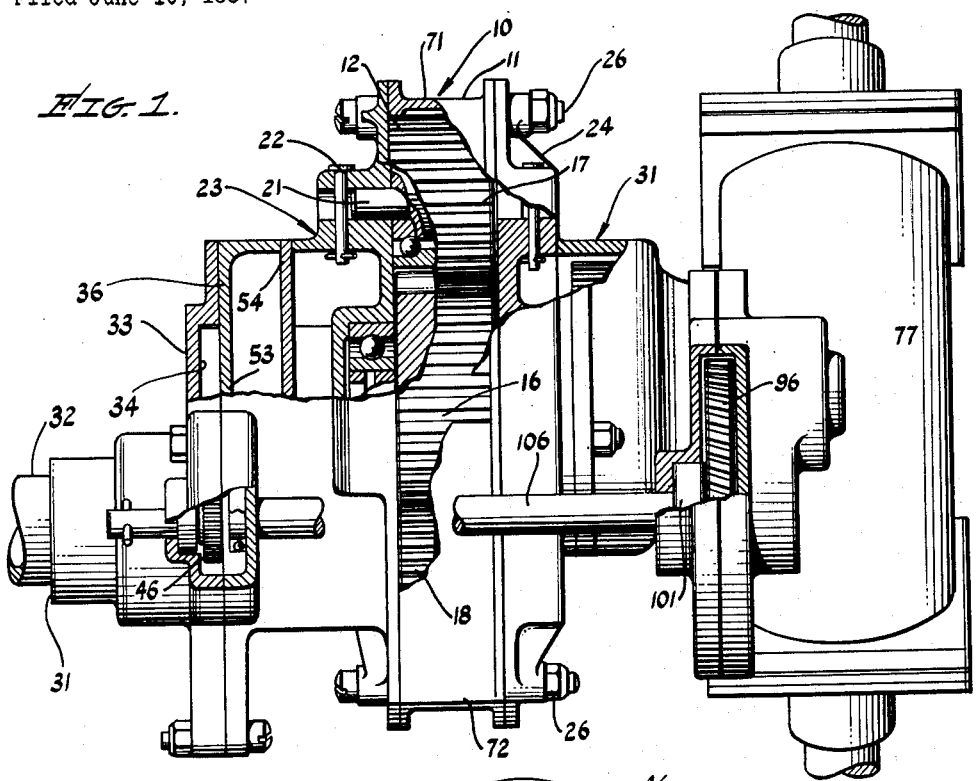
Fig. 1 is a plan view of an actuator in accordance with the invention.

Turning now to the drawings, there is shown an air motor 10 comprising a body section 11 defining a chamber 12 for receiving the central rotor 16, the left rotor 17 and the right rotor 18. Where, herein, we refer to left or right it is intended that the viewer regard the object facing the left end of the actuator as depicted in Fig. 1. The several rotors are provided with any conventional form of meshing teeth and are supported on anti-friction bearings. For the rotors 17 and 18 such bearings are carried on studs such as 21 retained endwise by pins such as 22. For the rotor 16 the bearings are carried in the manifold 23 and end plate 24 which, together with the body section 11, provide the motor housing. Bolts 26 secure these parts of the housing in a common manner.

Output of the motor is a shaft 27 carrying a pinion 28 forming the sun gear of a planetary transmission 31. Inasmuch as the planetary transmission is simply for the purposes of speed reduction the same does not form any part of the invention per se and will not be elaborated upon. In any case the output side thereof is indicated as a shaft 32 whose function will be adverted to hereinafter.

Admission of compressed air to the motor is effected through an inlet port 31 which is connected to the source of supply, e.g. the air compressor of the turbo-jet engine. Port 31 is part of the valve plate housing 33 which is provided with a recess 34 to slidably receive the movable plate 35. The valve body 36 abuts the housing 33 thereby to retain the valve plate between them. Mutually contacting surfaces are suitably ground for minimum clearances. Desirably the ports 51 and 52 are circumscribed by narrow lands to provide adequate sealing with the valve plate while reducing the sliding friction. Such construction also renders the valve self-cleaning. The valve plate 35 may be in sliding frictional engagement with the housing 33 or it may be roller bearingly mounted therein as in recess 34 to relieve friction between the plate and housing.

Plate 35 (Fig. 7) is provided with an aperture or port 41 adapted to assume three positions: to the left for one direction of actuation of the actuated object; to the right for the opposite direction of actuation, and midway for "off." Each of these three positions, as selected, is maintained by a spring-pressed detent 43 mounted in the housing 33 adapted to engage one of three depressions 44 in the plate 35. The plate 35 is provided with rack teeth 45 engaged by a pinion 46 which is driven in a manner to be detailed.

Valve body 36 (Fig. 6) is provided with a pair of apertures or ports 51 and 52 with each of which the port 41 is selectively adapted to be brought into register upon movement of the plate to its left or right positions respectively.

Valve body 36 is a box-like structure closed on the side nearest the valve plate by a wall 53 and closed on the opposite sides by a manifold cover or partition 54 (Fig. 5). The space thus defined in the body 36 is divided transversely by a wall 55 to define chambers 58 and 59. Egress from the chamber 58 is through ports 61, 62 and from chamber 59 through a port 63.

Manifold 23 abuts the partition 54 and includes a rectangular wall coextensive with the partition and suitably sealed thereby. Inner partitions 67 and 68 of the form shown divide the manifold into four sub-compartments 23A, 23BD and 23C as shown.

The ports B and D are employed to admit air to the rotors 16, 17 and 18 for clockwise rotation of the shaft 27 while ports A and C admit air for counter-clockwise rotation thereof.

Operation of the valve to accomplish the foregoing is as follows: Valve plate pinion 46 is arranged to shift the valve plate 35 in a manner which will be described. Assuming that clockwise rotation of the motor will correspond to driving the actuated object to some predetermined position the operator will manually cause movement of the plate 35 from "off" position, namely with port 41 intermediate the ports 51 and 52, to a position whereat port 41 registers with port 52. Thus compressed air from port 31 will pass through apertures 41 and 52, into sub-compartment 59, through port 63 and thence into compartment 23BD for exit through ports B and D to drive the motor 10. Fig. 9 illustrates the sequence just described, the broken line arrows representing air flow.

For the reverse condition, namely counter-clockwise rotation of the motor 10, the valve plate is shifted from "off" to the left, thereby placing ports 41 and 51 in register for air flow into sub-compartment 58, through ports 61 and 62, into sub-compartments 23A and 23C and through ports A and C to the rotors. This sequence is illustrated in Fig. 10.

Exhaust of the spent air occurs through ports 71 and 72 (Fig. 1).

Figure 2:
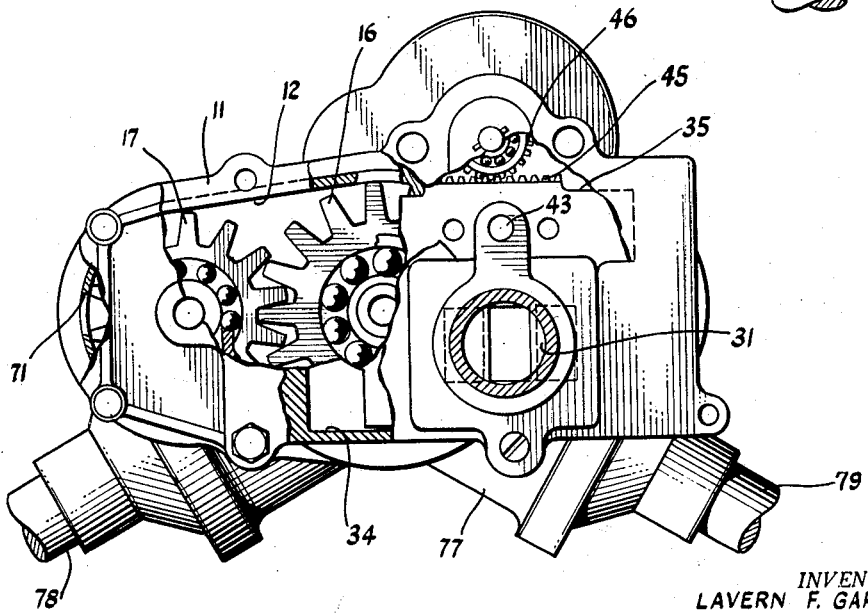
Fig. 2 is an end elevational view thereof taken from the left.

Output from the transmission 31a is delivered to a bevel gear 75 (Fig. 10) in mesh with bevel gears 76, only one of which is shown in the figure. However, by reference to Figs. 1 and 2 it will be seen that bevel gears 75 and 76 are carried in a housing 77 from which the respective output shafts 78 and 79 extend for connection to the actuated object. It will be understood, however, that shafts 78 and 79 may be connected to two actuated objects which are reversely rotated. In any event the means beyond the gear 75 form no part of the invention per se.

Operation of the actuator is initiated manually. To this end the pinion 46 is provided with a handle 91, by rotation of which the valve plate 35 may be shifted to the right or left as heretofore described. For convenience of illustration the rack teeth 45 are shown displaced from the valve plate proper in Figs. 9 and 10.

The shaft 32 is arranged to rotate a shaft 93 through gears 94, 95 and 96. A lost motion connection 101 is interposed between the gear 96 and gear 46. In the example, this lost motion connection preferably consists of a plurality of discs 102a, 102b and 102c having axially-extending pins 103a, 103b, 103c and 103d. Shaft 93 is keyed to disc 102a; the disc 102b is supported for free rotation and the disc 102c is keyed to a shaft 106 to which latter the pinion 46 and the handle 91 are also affixed.

The lost motion connection 101 serves to delay automatic closing of the valve until the actuator has performed its primary function. In the example this connection and the other parts are so arranged that rotation of the handle 91 approximately 60° will shift the valve plate from "off" to one of its two operative positions wherein it is retained by engagement of the detent 43 in one of the mating depressions 44. Thus the gear 96 is rotated. Such rotation is transmitted through the connection 101 with any desired lag which is suitably related to the time necessary for the actuator to drive the actuated object over its full stroke or cycle. Any specified delay may be achieved by suitable selection of the number of discs 102 and/or the position of the pins 103. Each disc drives the succeeding one through the pins until the movement is carried through to the last disc 102c for rotation of the pinion 46 in the reverse direction. The gear ratios are such that full stroke of the actuator is represented by some finite movement of the pinion 46 which will return the valve plate 35 from the previously selected "on" position to "off."

In Figs. 11 to 17 there is illustrated a modification of the invention wherein a rotary type valve is used instead of the slide plate type valve heretofore described. In this modification admission of compressed air to the motor is effected through an inlet port 231 which is connected to the source of supply. Port 231 is part of the valve rotor or barrel 235 mounted in valve body 233. The port 231 extends coaxially of the rotor 235 and diametrically opposite radial rotor ports 241 and 241' merge therewith.

The valve body is provided with diametrically opposite ports B' and D' to admit air to the rotors 16, 17 and 18 for clockwise rotation of shaft 27 as well as diametrically opposite ports A and C to admit air for counterclockwise rotation, the air traveling from inlet port 231 to the desired ports B' and D' or A'C' through ports 241 and 241'.

As best illustrated, in Fig. 15 the barrell or rotor has gear teeth 245 in mesh with pinion gear 46 for operation of the valve in similar manner and for the same purpose as described in connection with the hereinbefore described plate valve.

The barrell or rotor is also provided with recesses 242 and 242' and the housing or valve body 233 with exhaust ports 243 and 243' which are alignable respectively with the responsive desired ones of ports A', B', C', and D'.

These recesses and exhaust ports are mergeable with desired ones of the ports A', B', C', and D' to relieve any back pressure in the motor resulting from driving the motor in one direction before it is driven in a reverse direction.

For example, when valve rotor 235 is positioned to drive the motor, say counterclockwise (Fig. 13), ports B' and D' are bled through exhaust ports 243 and 243' while air from inlet port enters ports A' and C' to drive the motor. When valve rotor 235 is moved to drive the motor clockwise (Fig. 14) the recesses 242, 242' bleed air, which may have been entrapped as back pressure in the motor during counterclockwise driving, from ports A' and C' to exhaust ports 243 and 243' while air from inlet port 231 is driven through ports B' and D' to drive the motor or prime mover.

In this way it is not necessary to overcome any pressures previously built up in the motor during the starting of operation of the motor in a reverse direction. Naturally when the valve is in off position the inlet port 231 and the exhaust ports 243, 243′ are not in communication with any of the ports A′, B′, C′, or D′ (Fig. 12).

In both embodiments of the invention as described and illustrated the objects of the invention are accomplished and reverse actuation is accomplished in an obvious manner. However, it will be noted that the invention device is adapted for "forward" operation followed by only "reverse" operation. Thus the lost motion connection is always effective on the reverse rotation of the gear 96. Stated otherwise the actuator may be employed only for those applications wherein the actuated object, once moved, must be returned to its original position.

The lost motion connection possesses the additional advantage of allowing the valve plate to be shifted to one of its operative positions without back-driving the parts directly connected to the air motor. Consequently, only a small input force is required.

The invention device is completely pneumatic and mechanical thereby assuring a high degree of reliability at extremely high temperatures.

While we have shown a particular embodiment of our invention, it will be understood, of course, that we do not wish to be limited thereto since many modifications may be made and we therefore contemplate by the appended claim to cover any such modifications as fall within the true spirit and scope of our invention.

We claim:

An actuator for providing alternated forward and reverse movement of the actuated object in response to an input force of one direction or its opposite comprising: a reversible, fluid-operated prime mover for moving the actuated object, a valve for initiating and terminating operation of the prime mover, a member for application of the input force connected to said valve for moving the valve from an "off" position to either "forward" or "reverse" positions, means connecting the output side of the motor to the object, and means connnecting said output side to said member including a first shaft rotatable by said output side, a second shaft coaxial with said first shaft for rotation of said member and a plurality of tandem-arranged, rotatably-supported, lost motion discs positioned between said shafts, a first one of said discs being secured to said first shaft, a second one of said discs being secured to said second shaft, the remainder of said plurality being mounted intermediate said first and second discs, one face of each of said first and second discs carrying mutually confronting axially-extending pins, both faces of the intermediate discs carrying an axially-extending pin, all of said pins being positioned for successive abutment upon rotation of said first disc, the initial angular displacement of the pins being such as to provide a desired delay between rotation of said first disc and rotation of said second disc, whereby said member and the valve operated thereby are restored to "off" position following a predetermined delay period measured from the time of application of the input force.

References Cited in the file of this patent

UNITED STATES PATENTS

| | | |
|---|---|---|
| 603,038 | Harfield | Apr. 26, 1898 |
| 1,081,458 | McKenney | Dec. 16, 1913 |
| 1,540,870 | Adams | June 9, 1925 |
| 2,243,656 | Shannon | May 27, 1941 |
| 2,283,397 | Tucker | May 19, 1942 |
| 2,352,140 | Trott | June 20, 1944 |